CONTROLLABLE SEMICONDUCTOR ELEMENT

INVENTOR.
Edouard Eugster
BY
Pierce, Scheffler & Parker
Attorneys

INVENTOR.
Edouard Eugster
BY
Pierce, Scheffler & Parker
Attorneys

INVENTOR.
Edouard Eugster
BY
Pierce, Scheffler & Parker
Attorneys

United States Patent Office 3,437,889

Patented Apr. 8, 1969

3,437,889

CONTROLLABLE SEMICONDUCTOR ELEMENT

Edouard Eugster, Windisch, Switzerland, assignor to Aktiengesellschaft Brown, Boveri & Cie, Baden, Switzerland, a joint stock company Filed Nov. 14, 1966, Ser. No. 593,797
Claims priority, application Switzerland, Dec. 22, 1965, 17,684/65, Patent 437,538
Int. Cl. H01l 11/10
U.S. Cl. 317—235 6 Claims

ABSTRACT OF THE DISCLOSURE

A four layer p-n-p-n semiconductor structure comprises a disc of semiconductor material in the shape of a cone frustum, there being two outer zones adjacent the electrodes applied to opposite faces of the structure, and an inner zone adjacent each of the outer zones. The outer zones are interrupted at various places over their surface area to establish short-circuit connections between the facing electrodes and the corresponding inner zone. A pair of such frustoconical four layer semiconductor structures can be joined together at their end surfaces which have the least diameter, or one such four layer semiconductor structure can be similarly joined to a frustoconically configured semiconductor diode structure.

The present invention relates to a controllable semiconductor element which comprises a four-layer p-n-p-n zone structure and wherein the oppositely disposed outer zones of this structure are faced respectively by planar and parallel electrodes.

The p-n-p-n semiconductor structure forms, as is known, the basis of silicon current-gates (thyristors). In this connection, two p-n transitions connected in opposition have a cutoff action, one in each direction. A control current via the third p-n transition enables the cutoff action to be removed in one direction of voltage. Thyristors usually comprise a semiconductor disc, the p-n-p-n structure consisting of layer-shaped zones exhibiting alternating types of conduction. Production of the semiconductor disc begins for example with the production of a p-n-p structure by diffusing acceptor substance into a semiconductor disc exhibiting n-type conduction. The diffused-in zones then exhibit a considerably higher doping density, i.e., higher impurity concentration. The fourth zone is thereupon added, for example by diffusing in or alloying in. In order to lengthen the creep path in the edge zone, the semiconductor disc is made in the form of a conical frustum by suitable processing. In the absence of current, the progression of potential in the semiconductor disc is determined by the doping profile. The potential lines therefore become deformed at the edge of the weakly doped zone in such a manner as to approach one another in the direction in which the conical frustum becomes narrower, and reduce the creep path there.

The slope on the conical frustum is thus optimum only for one transition. Furthermore, neither the breakdown voltage in the cutoff direction nor the shape of the characteristic in the conductive direction in known thyristors is capable of being optimized for a definite purpose, one independently of the other.

It is the object of the invention to provide a controllable semiconductor element having a p-n-p-n structure wherein these disadvantages do not occur, and which can be connected to other semiconductor elements in such a manner that there is a large degree of freedom in attaining optimum characteristics.

The semiconductor element according to the invention having a p-n-p-n structure is characterized in that these outer zones only partly cover the adjoining electrode surfaces, and in that there is a short-circuiting electrical connection between each electrode and the inner zone disposed next to it in the current-path of the structure, so that its characteristic represents a short-circuit in one direction of voltage.

The invention will be explained by way of example with reference to the accompanying drawings. For the sake of greater clarity, the individual zones of conduction are illustrated exaggeratedly thick.

Figure 1:
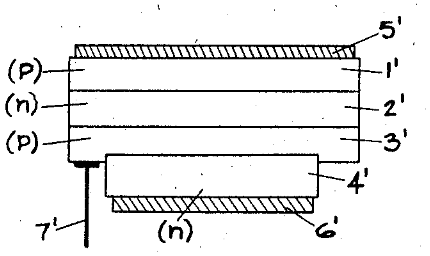
FIG. 1 is a view illustrating the principle of construction of a known four-layer semiconductor element.

FIGURE 1 shows the principle of the structure of a known thyristor. The p-n-p structure of zones 1′ to 3′, which has been produced for example by diffusing acceptor substance into a disc exhibiting n-type conduction, is supplemented by alloying on a zone 4′ exhibiting n-type conduction to form a p-n-p-n structure to the faces of which the anode 5′ and the cathode 6′ are fitted.

The control electrode 7′ is connected to the inner zone 3′ which exhibits p-type conduction.

Figure 2:
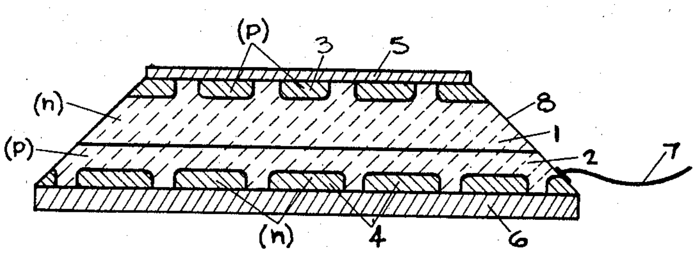
FIG. 2 is a view illustrating an improved p-n-p-n semiconductor structure in accordance with the present invention.

FIGURE 2 shows the diagrammatic construction of a semiconductor element according to the invention. Here also, the p-n transition between the zones 1–2 extends over the whole surface of the semiconductor disc. This transition serves for the cutoff action in the forward direction. The outer zones 3 and 4 likewise adjoin the electrodes 5 and 6, but only partly cover them. As a result, minority injection in the forward direction for the p-n transitions between the zones 3 and 1, and between 2 and 4 is essentially preserved, but their cutoff action is eliminated because there is a short-circuit between each electrode 5 or 6 and the inner zone disposed next to it in the current-path of the structure. The inner zone 2 exhibiting p-type conduction has a higher doping density than the zone 1 exhibiting n-type conduction. The edge surface 8 of the semiconductor disc is made in the form of the exterior of a conical frustum so that the more highly doped zone 2 is disposed towards the base. This ensures that the creep path on the marginal surface at the p-n transition between the zones 1 and 2 is augmented in the cutoff region. The inclination of the frustoconical surface is of the order of 10°–12°, so that the exposed surface of the zone 2 is sufficiently large to fit a control electrode 7.

Various intrinsically known processes may be used in order to produce a semiconductor element according to FIGURE 2.

A preferred process begins for example by diffusing acceptor substance from the gas phase onto a monocrystalline silicon disc exhibiting n-type conduction in order to form a more highly doped p zone, which is thereafter removed again from one face of the disc.

Figure 3:
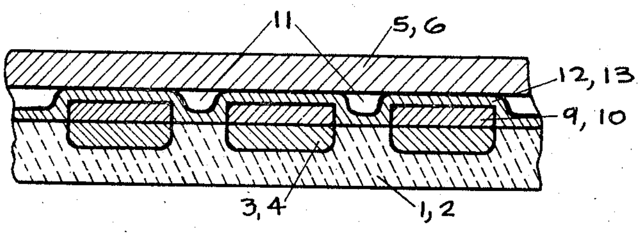
FIG. 3 is a view illustrating steps in the process of forming the outer zones and adjoining electrodes.

The further steps of the process for forming the outer zones and the adjoining electrodes will be explained with reference to FIGURE 3.

The exposed face of each inner zone 1, 2 is covered with a metal disc 9, 10 containing a suitable endowment substance and comprising perforations 11 distributed over its surface. Subsequently alloying on the metal discs 9, 10 causes the outer zone 3, 4 to be formed under it in known manner, while in place of the perforations 11 the inner zone 1, 2 still lies exposed on the surface. Before the electrodes are soldered on, a layer of metal 12, 13 which produces the short-circuit between the inner zones 1, 2 and the electrodes 5, 6 is vapor-coated on. Finally, the frustoconical shape is produced and the control electrode 7 is welded on.

Figure 4:
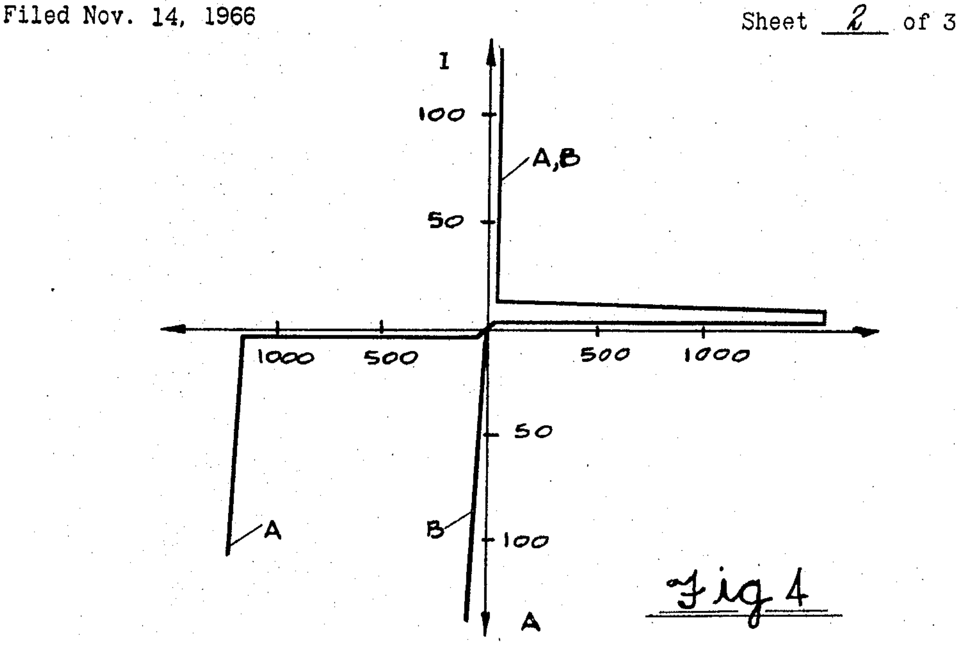
FIG. 4 is a graph illustrating the difference in principle between the characteristics of a thyrister and a semiconductor element in accordance with the present invention.

FIGURE 4 reproduces the difference in principle between the characteristic of a known thyristor A and that of the semiconductor element B according to the invention. It will be seen that A and B coincide in the forward direction, while B represents a short-circuit in the reverse direction.

This property of the semiconductor element according to the invention is advantageously used by combining it with another element, with suitable polarity, to form a column so that the characteristic of each semiconductor element determines the characteristic of the column in one direction of voltage.

The characteristic of the column may therefore be freely selected for itself within wide limits for each direction of voltage.

Figure 5:
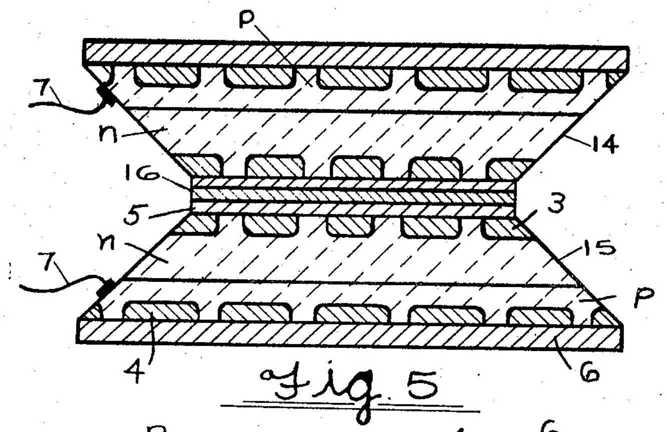
FIG. 5 illustrates a modified embodiment of the invention wherein a pair of semiconductor elements having the improved structural principles of FIG. 2 are combined into a composite structure.
Figure 6:
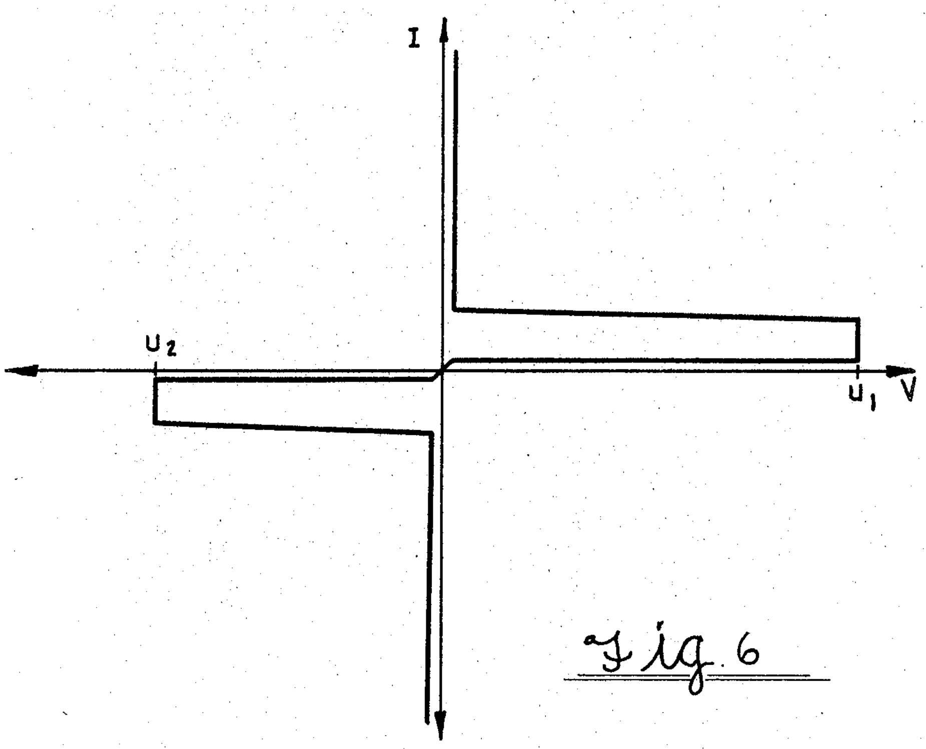
FIG. 6 is a graph illustrating the operating characteristics of the composite semiconductor structure shown in FIG. 5.

FIGURES 5 and 6 show the combination of two semiconductor elements 14 and 15 according to the invention and the associated characteristics. The breakdown voltages $U_1$, $U_2$ as plotted in FIG. 6 may be freely selected.

Figure 7:
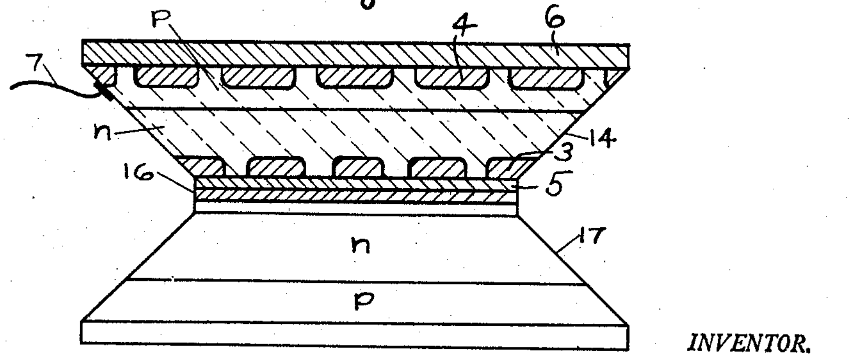
FIG. 7 illustrates a further modified embodiment of the invention wherein a semiconductor element having the improved structural principles of FIG. 2 is combined with a semiconductor diode to establish a composite structure.
Figure 8:
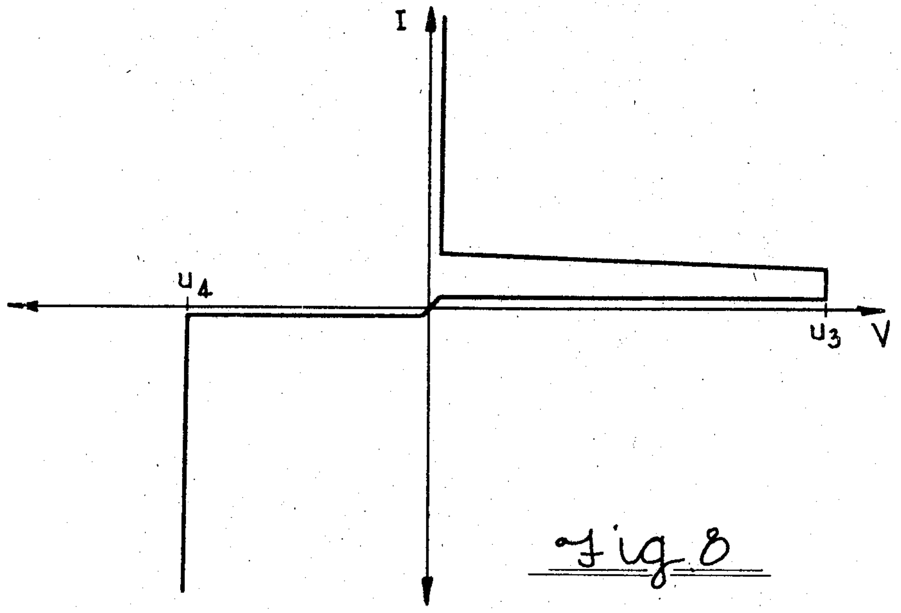
FIG. 8 is a graph illustrating the operating characteristics of the composite semiconductor structure shown in FIG. 7.

However, the semiconductor element 14 according to the invention may also be combined with a semiconductor diode 17, as shown in FIGURE 7. Here also, the breakdown voltages may be freely selected, as the associated characteristic (FIGURE 8) shows.

The columns according to FIGURES 5 and 7 may be contacted in the same manner as a single semiconductor element.

The semiconductor elements 14 and 15, or 14 and 17 are expediently combined by a layer of solder 16.

I claim:

1. A controlable semiconductor structure comprising a pair of four zone p-n-p-n semiconductor elements, each said semiconductor element comprising a disc of semiconductor material having the configuration of a cone frustum, plane and parallel electrodes applied respectively to the opposite faces of said disc, said disc including an outer zone at each face thereof extending over only parts of the total surface of the electrode in contact therewith, and an inner zone adjacent said outer zone and including portions thereof reaching to the surface of the appertaining electrode at those portions thereof not contacted by the outer zone to establish short-circuit electrical connections between the electrodes and the inner zones, said inner zones exhibiting different doping densities and the base of the cone frustum being disposed towards that inner zone which is more highly doped, and a control electrode applied to the frustoconical edge surface of that inner zone which is more highly doped, and means joining the electrodes of said semiconductor elements to establish a column.

2. A controllable semiconductor structure as defined in claim 1 and wherein said semiconductor element joining means includes a layer of solder joining the electrodes of said semiconductor elements together.

3. A controllable semiconductor structure as defined in claim 1 and which includes a vapor-coated layer of metal interposed between said electrode and those portions of said inner zone which reach to said electrode to thereby establish and short-circuit connections.

4. A controllable semiconductor structure comprising a four zone p-n-p-n controllable semiconductor element including a frustoconical disc of semiconductor material, plane and parallel electrodes applied respectively to the opposite faces of said disc, said disc including an outer zone at each face thereof extending over only parts of the total surface of the electrode in contact therewith, and an inner zone adjacent said outer zone and including portions thereof reaching to the surface of the appertaining electrode at those portions thereof not contacted by the outer zone to establish short-circuit electrical connections between the electrodes and the iner zones, said inner zones exhibiting differing doping densities and the base of the cone frustum being disposed towards that inner zone which is more highly doped, and a control electrode applied to the frustoconical edge surface of that inner zone which is more highly doped; and a second semiconductor element in frustoconical disc form of the diode type having the appropriate polarity and including an electrode in one face thereof joined to an electrode on said four zone semiconductor element to establish a column such that the characteristic of each semiconductor element determines the characteristic of the column in one direction of the applied voltage.

5. A controllable semiconductor structure as defined in claim 4 and which includes a layer of solder joining the electrodes of said semiconductor elements together to establish the column.

6. A controllable semiconductor structure as defined in claim 4 and which includes a vapor-coated layer of metal interposed between said electrode and those portions of said inner zone which reach to said electrode to thereby establish said short-circuit connections.

References Cited

UNITED STATES PATENTS

| | | | |
|---|---|---|---|
| 2,879,190 | 3/1959 | Logan et al. | 317—235 |
| 2,971,139 | 2/1961 | Noyce | 317—235 |
| 3,018,392 | 1/1962 | Jones et al. | 317—235 |
| 3,069,603 | 12/1962 | Hunter | 317—235 |
| 3,179,860 | 4/1965 | Clark et al. | 317—235 |

FOREIGN PATENTS 945,249 12/1963 Great Britain.

JOHN W. HUCKERT, *Primary Examiner.*

JERRY D. CRAIG, *Assistant Examiner.*

U.S. Cl. X.R

307—305